March 31, 1931.  F. WEHINGER  1,798,918
RATCHET MECHANISM FOR TIMEPIECES
Filed May 9, 1929
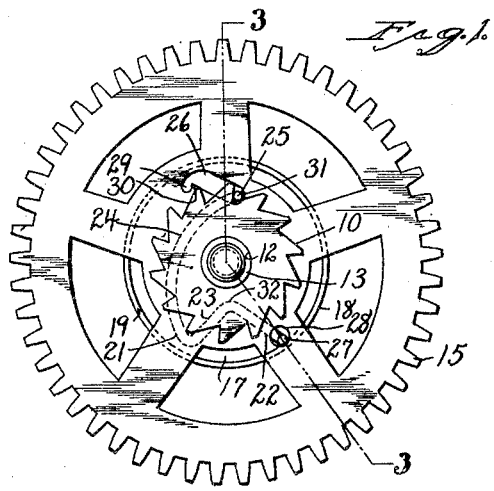
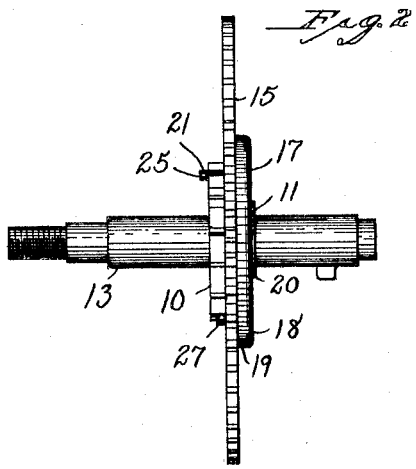
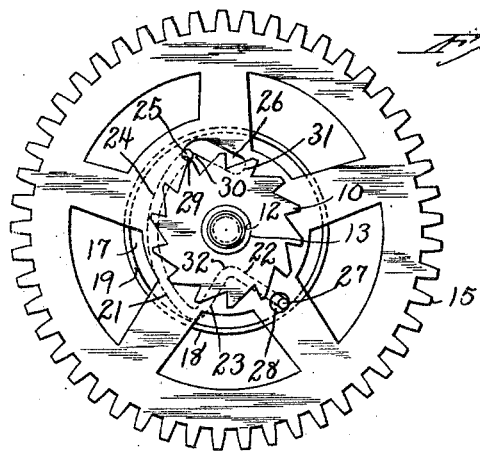
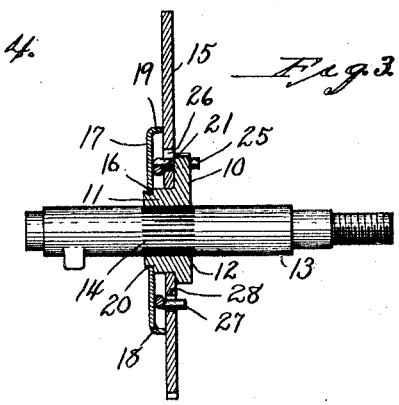
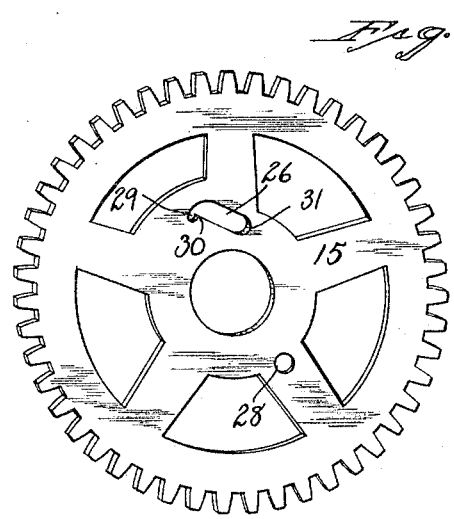
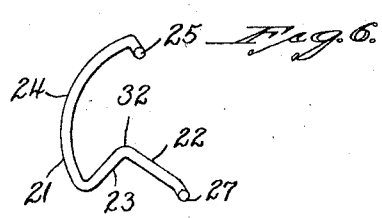
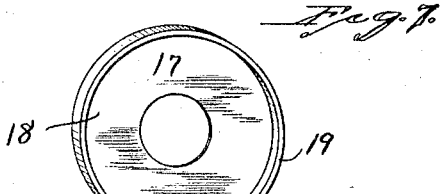
Inventor.
Frederick Wehinger
by Seymour Earle Nichols
Attys Patented Mar. 31, 1931

1,798,918

UNITED STATES PATENT OFFICE

FREDERICK WEHINGER, OF WATERBURY, CONNECTICUT, ASSIGNOR TO THE WATERBURY CLOCK CO., OF WATERBURY, CONNECTICUT, A CORPORATION

RATCHET MECHANISM FOR TIMEPIECES

Application filed May 9, 1929. Serial No. 361,716.

This invention relates to an improvement in ratchet-mechanisms and particularly to ratchet-mechanisms for clocks and watches.

One of the objects of this invention is to produce at a low cost for manufacture a simple, strong and reliable ratchet-mechanism particularly suited for use in timepieces.

Another object of my invention is to provide a ratchet-mechanism in which the pawl may be readily thrown out of action and held in such position as to facilitate the repair and adjustment of a timepiece in which my improved ratchet-mechanism is installed.

With the above objects in view, my invention consists in a ratchet-mechanism for timepieces having certain details of construction and combinations of parts as will be hereinafter recited in the claims.

In the accompanying drawings:

Fig. 1 is a face view of a ratchet-mechanism constructed in accordance with my invention;

Fig. 2 is an edge view thereof;

Fig. 3 is a transverse sectional view taken on the line 3—3 of Fig. 1;

Fig. 4 is a face view corresponding to Fig. 1 but showing the spring-pawl hooked into its clearance or retired position;

Fig. 5 is a detached perspective view of the gear-wheel;

Fig. 6 is a similar view of the spring-pawl; and

Fig. 7 is a corresponding view of the pawl-retaining cup.

In carrying out my invention as herein shown, I employ a ratchet-wheel 10 having extending from one of its faces a concentric tubular hub 11 and formed with an axial bore 12 adapted to be driven over an arbor 13 and tightly engage the central serrated portion 14 thereof.

The exterior of the hub 11 provides a bearing for a gear-wheel 15 which also bears against the face of the ratchet-wheel 10 from which the said hub projects. The end of the hub 11 above referred to is reduced in diameter to form a shoulder 16 against which is clamped the disk-like body-portion 17 of a retaining-cup 18 which has its annular flange 19 bearing against the adjacent face of the gear-wheel 15 so as to retain the same against the adjacent face of the ratchet-wheel 10. The said retaining-cup 18 is locked in place by swaging over the extreme end of the hub 11 of the ratchet-wheel as at 20.

Positioned around the hub 11 of the ratchet-wheel 10 and between the adjacent faces of the retaining-cup 18 and the gear-wheel 15, is a spring-pawl 21 comprising substantially right-angled straight reaches 22 and 23 and a relatively-long arcuate reach 24, which latter terminates in a pawl-finger 25 offsetting at a right angle from the plane of the reaches 22, 23 and 24 and is adapted to project forward through a tangential slot 26 in the gear-wheel 15 and into engagement with the teeth of the ratchet-wheel 10.

The opposite end of the spring-pawl 21 has projecting from it at a right angle a positioning-finger 27 extending into a positioning-hole 28 in the gear-wheel 15 and serving to anchor the spring-pawl against displacement as the opposite end thereof is flexed, as will hereinafter appear.

The tangential slot 26 before described terminates at its outer end in a right-angled inwardly-turned reach 29 which results in the formation of a retaining-finger 30 for the purpose as will hereinafter appear.

In the use of my improved ratchet-mechanism, when the ratchet-wheel 10 is turned in a counter-clockwise direction (as viewed in Figs. 1 and 4) by the arbor 13 to which it is coupled, the pawl-finger 25 of the spring-pawl 21 will be caused to ride up the inner wall of the tangential slot 26 by each of the successive teeth of the said ratchet-wheel that may be caused to pass under it.

When, on the other hand, the ratchet-wheel is rotated in a clockwise direction (as by a clock-spring), the radial faces of the teeth of the ratchet-wheel 10 will crowd the ratchet-finger 25 of the spring-pawl 21 against the end-wall 31 of the tangential slot 26 and hence impose a readily-resisted shearing strain upon the pawl-finger 25 and so prevent relative rotation between the ratchet-wheel and the gear-wheel 15 in the direction just above described.

As each of the successive teeth ride under the pawl-finger 25 and cam the same up the inner wall of the tangential slot 26, the reach 24 and, to a lesser degree, the reaches 23 and 22 are flexed to permit this action, during which the junction-bend 32 of the reaches 22 and 23 engages the outer periphery of the ratchet-wheel hub 11.

If for any reason it is desired to retire the pawl-finger 25 out of the path of the teeth of the ratchet-wheel 10 so that free relative rotation in either direction may take place between the latter and the gear-wheel 15, the said pawl-finger 25 may be forced by means of a suitable implement outward and into the right-angled reach 29 of the tangential slot 26, in which position it will be retained by the retaining-finger 30. When it is desired to restore the pawl-finger 25 to action, this may be effected by unhooking it from behind the finger 30 and permitting it to ride down the main portion of the tangential slot 26 into engagement with the teeth of the ratchet-wheel.

From the foregoing it will be seen that I have provided a single member which performs the two-fold function of a pawl and pawl-spring in a simple and efficacious manner and it will further be seen that the same may be readily thrown into and out of action as may be required to permit the ready repair or adjustment of the timepiece in which my improved ratchet-mechanism is installed.

I claim:

1. In a ratchet-mechanism, the combination with an arbor; of a ratchet-wheel and slotted drive-wheel both mounted upon the said arbor adjacent each other, one of the said wheels being coupled to the said arbor and the other wheel being rotatable with respect thereto; a spring-pawl located upon the side of the said drive-wheel opposite to the said ratchet-wheel and having a pawl-finger extending through the slot in the said drive-wheel into engagement with the teeth of the said ratchet-wheel; whereby the said pawl-finger is subjected to a shearing strain between a tooth of the said ratchet-wheel and the wall of the slot in the said drive-wheel.

2. A ratchet-mechanism as defined in claim 1 and having the drive-wheel formed with a tangential slot and with a retaining-finger projecting thereinto for engagement by the pawl-finger when the same is manually forced out of co-action with the teeth of the ratchet-wheel.

3. In a ratchet-mechanism, the combination with a ratchet-wheel and a co-axial drive-wheel mounted adjacent each other with capacity for relative rotary movement, the said drive-wheel being formed with a clearance-opening; of a pawl located adjacent the side of the said drive-wheel opposite to the said ratchet-wheel and having an offsetting pawl-finger projecting through and bodily movable in the clearance-opening in the said drive-wheel and engaging with the said ratchet-wheel; whereby the said pawl-finger is subjected to a shearing strain between a tooth of the said ratchet-wheel and the wall of the opening in the said drive-wheel.

4. In a ratchet-mechanism, the combination with a ratchet-wheel and a co-axial drive-wheel mounted adjacent each other with capacity for relative rotary movement, the said drive-wheel being formed with a clearance-opening having a tangential inner wall inclined opposite to the inclined faces of the teeth of the said ratchet-wheel; of a pawl located adjacent the side of the said drive-wheel opposite to the said ratchet-wheel and having an offsetting pawl-finger projecting through the clearance-opening in the said drive-wheel into engagement with the said ratchet-wheel; whereby when relative rotary movement takes place between the said wheels in one direction, the inclined faces of the teeth of the ratchet-wheel will cause the said pawl-finger to ride up the tangential inner wall of the slot in the said drive-wheel and whereby when relative rotation between the said wheels takes place in the opposite direction, the said pawl-finger will be subjected to a shearing strain between a tooth of the said ratchet-wheel and the wall of the clearance-opening in the said drive-wheel.

5. In a ratchet-mechanism, the combination with a ratchet-wheel and a co-axial drive-wheel mounted adjacent each other with capacity for relative rotary movement, the said drive-wheel being formed with a clearance-opening and a positioning-opening; of a bowed spring-pawl located adjacent the side of the said drive-wheel opposite to the said ratchet-wheel and having an offsetting pawl-finger projecting through the clearance-opening in the said drive-wheel into engagement with a tooth of the said ratchet-wheel and with a positioning-finger projecting into the positioning-opening in the said drive-wheel.

6. In a ratchet-mechanism, the combination with an arbor; of a ratchet-wheel mounted upon the said arbor and formed with an offsetting-hub; of a drive-wheel rotatably mounted upon the hub of the said ratchet-wheel and formed with a clearance-opening; and a spring-pawl located upon the side of the said drive-wheel opposite to the said ratchet-wheel and having a pawl-finger extending through the clearance-opening in the said drive-wheel into engagement with the teeth of the said ratchet-wheel; whereby the said pawl-finger is subjected to a shearing strain between a tooth of the said ratchet-wheel and the wall of the opening in the said drive-wheel.

7. In a ratchet-mechanism, the combination with an arbor; of a ratchet-wheel mounted upon the said arbor and formed with an offsetting-hub; a drive-wheel rotatably mounted upon the hub of the said ratchet-wheel and formed with a clearance-opening; a spring-pawl located upon the side of the said drive-wheel opposite to the said ratchet-wheel and having a pawl-finger extending through the clearance-opening in the said drive-wheel into engagement with the teeth of the said ratchet-wheel; and a retaining-cup located over the said spring-pawl and secured to the hub of the said ratchet-wheel; whereby the said pawl-finger is subjected to a shearing strain between a tooth of the said ratchet-wheel and the wall of the opening in the said drive-wheel.

8. In a ratchet-mechanism, the combination with a ratchet-wheel and a co-axial drive-wheel mounted adjacent each other with capacity for relative rotation, the said drive-wheel being formed with a clearance-opening; of a spring-pawl carried by the said drive-wheel and having an offsetting pawl-finger entered into the opening therein and engaging the teeth of the said ratchet-wheel; whereby the said pawl-finger is subjected to a shearing strain between a tooth of the said ratchet-wheel and the wall of the opening in the said drive-wheel.

9. In a ratchet-mechanism, the combination with a ratchet-wheel and a co-axial drive-wheel mounted adjacent each other with capacity for relative rotation, the said drive-wheel being formed with a clearance-opening having a pawl-retaining finger projecting outward thereinto; of a spring-pawl carried by the said drive-wheel and having an offsetting pawl-finger entered into the opening therein and engaging a tooth of the said ratchet-wheel; whereby the said pawl-finger may be thrown out of action by manually hooking it over the pawl-retaining finger in the said drive-wheel.

In testimony whereof, I have signed this specification.

FREDERICK WEHINGER.